United States Patent [19]

Ewer

[11] Patent Number: 5,641,108

[45] Date of Patent: Jun. 24, 1997

[54] BICYCLE AND SKI CARRIER FOR ATTACHMENT TO AN AUTOMOBILE RECEIVER HITCH

[76] Inventor: Darin Ewer, 230 N. 100 West, Providence, Utah 84332

[21] Appl. No.: 532,025

[22] Filed: Sep. 21, 1995

[51] Int. Cl.⁶ .................. B60R 9/10; B60R 9/12
[52] U.S. Cl. .......... 224/536; 224/502; 224/521; 224/532; 224/917.5; 224/924
[58] Field of Search ............. 224/488, 495, 224/500, 501, 502, 504, 505, 506, 518, 521, 522, 523, 524, 531, 532, 533, 535, 536, 537, 917.5, 924; D12/400, 406, 407, 408

[56] References Cited

U.S. PATENT DOCUMENTS

| | | | |
|---|---|---|---|
| D. 341,348 | 11/1993 | Williams | D12/408 |
| D. 343,151 | 1/1994 | Eckhart | 224/521 |
| D. 352,925 | 11/1994 | Eckhart | D12/406 |
| 4,856,686 | 8/1989 | Workentine | 224/500 |
| 5,050,785 | 9/1991 | Hays | 224/532 |
| 5,067,641 | 11/1991 | Johnson et al. | 224/501 |
| 5,169,042 | 12/1992 | Ching | 224/924 |
| 5,190,195 | 3/1993 | Fullhart et al. | 224/924 |
| 5,305,936 | 4/1994 | Nusbaum | 224/924 |
| 5,330,084 | 7/1994 | Peters | 224/506 |
| 5,330,312 | 7/1994 | Allsop et al. | 224/505 |
| 5,373,978 | 12/1994 | Buttchen et al. | 224/917.5 |
| 5,449,101 | 9/1995 | Van Dusen | 224/506 |
| 5,469,997 | 11/1995 | Carlson | 224/506 |

OTHER PUBLICATIONS

T-Rex Raks (advertisement, no date given).
Herrington Catolog: Piper Triple Bike Rack 1995.

*Primary Examiner*—Renee S. Luebke
*Assistant Examiner*—Gregory M. Vidovich

[57] ABSTRACT

A bicycle and ski carrier for attachment to a common trailer type receiver hitch on an automobile. The main member (6) of the carrier contains trays(18) to support bicycles by the top tube of their frame. A ski support (9) holds skis under their rear binding in a vertical position. A hinged, locking lid (13) is used to lock either bicycles or skis against the carrier's main member (6) for security. A horizontal telescoping member (4) which supports the main member (6) allows main member (6) to be raised for additional ground clearance for ski tails and rotate 90 degrees to a position perpendicular to the axis of the automobile.

8 Claims, 6 Drawing Sheets

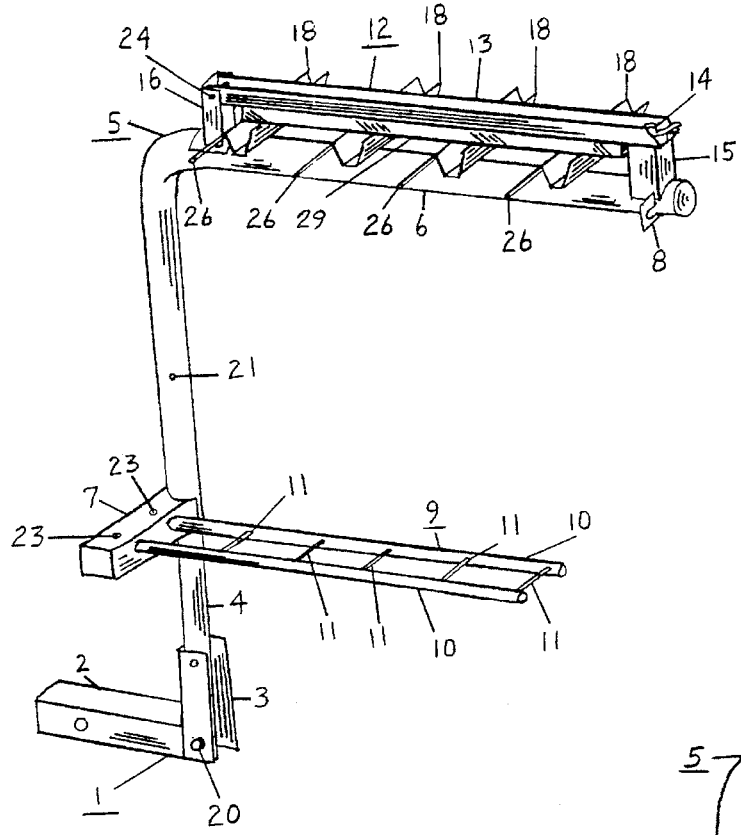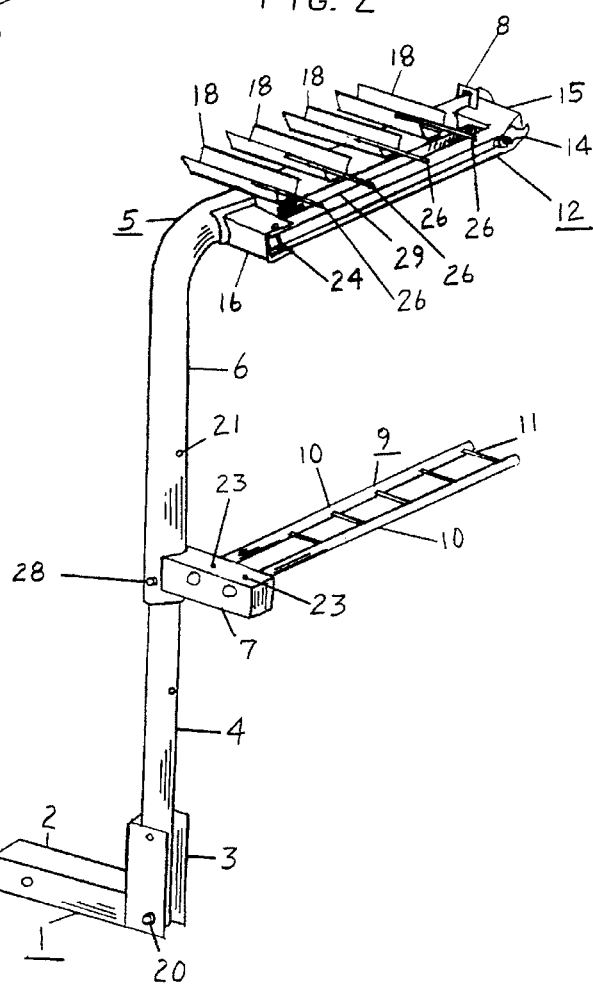

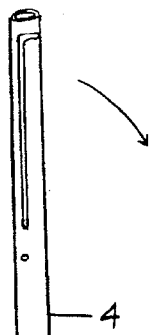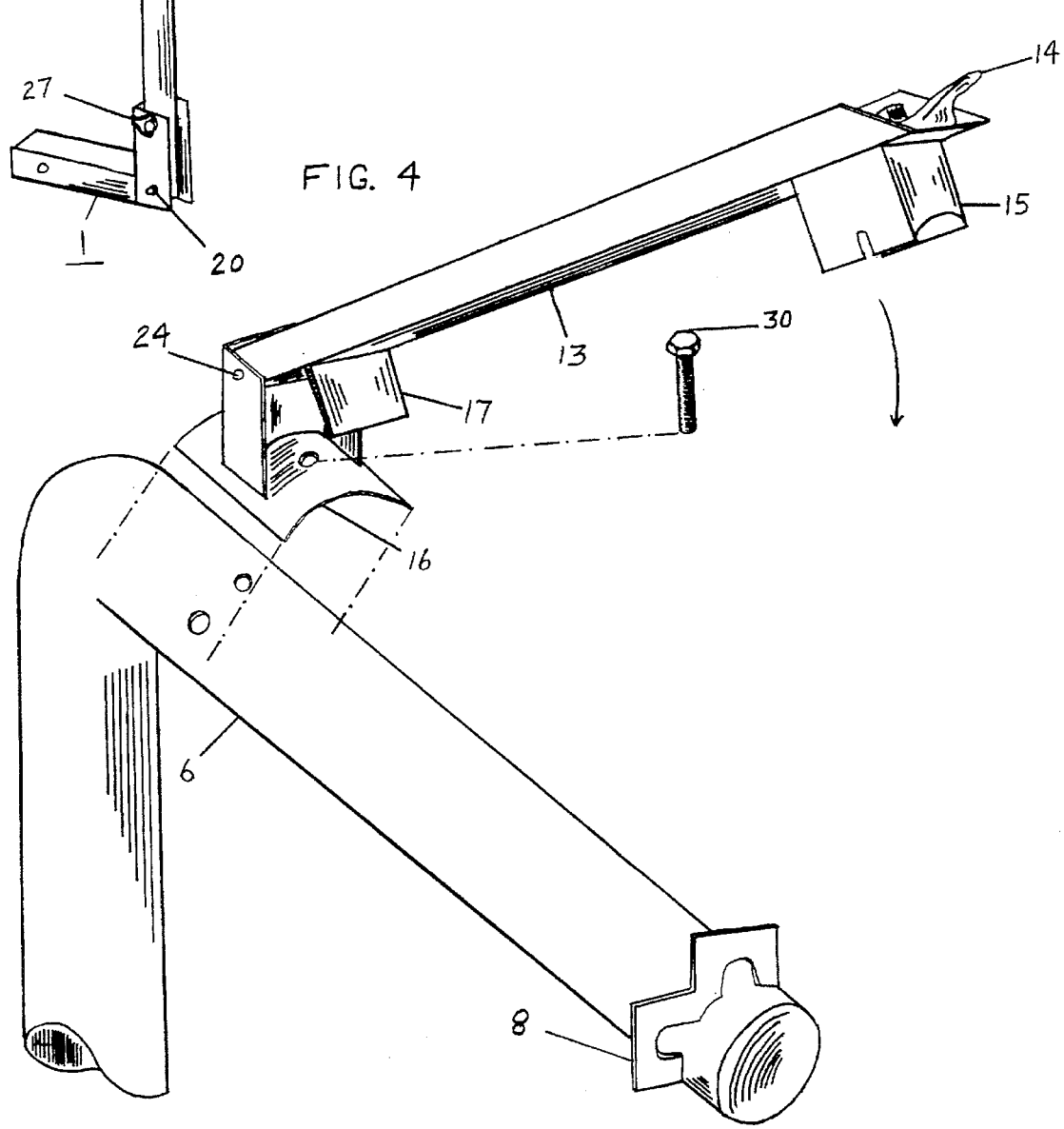

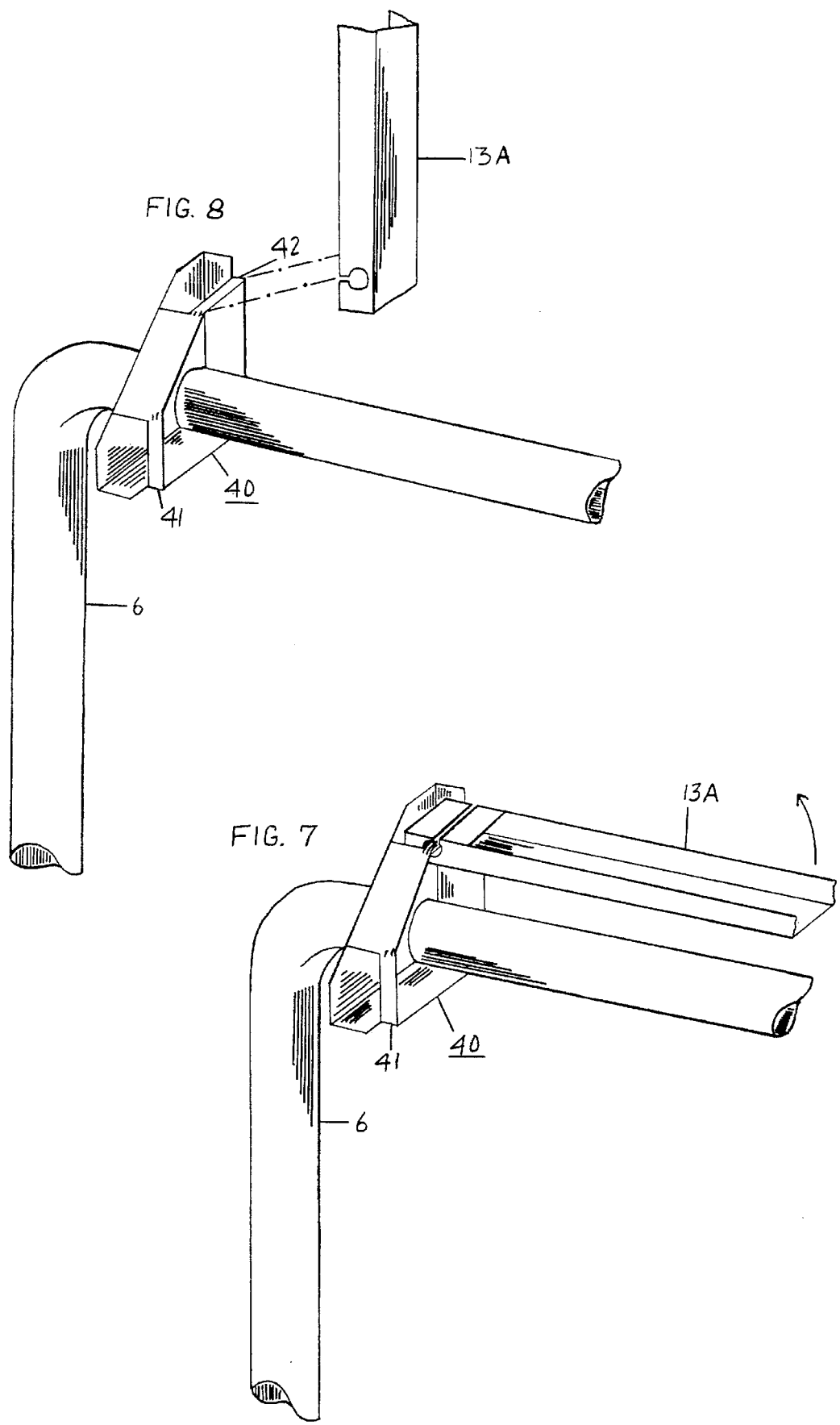

1

BICYCLE AND SKI CARRIER FOR ATTACHMENT TO AN AUTOMOBILE RECEIVER HITCH

BACKGROUND—FIELD OF INVENTION

This invention relates to a bicycle and ski carrier for automobiles, specifically to such a carrier to be attached to a standard trailer receiver hitch.

BACKGROUND—DESCRIPTION OF PRIOR ART

Receiver hitch mounted carriers for bicycles have become increasingly popular. Their attachment methods to the automobile is much less complex than that for roof mounted racks and because hitch mounted carriers are close to the ground they are easier to load. Most hitch mounted or other type of carriers or racks that mount to the rear of an automobile carry bicycles by holding the top tube of the bicycle frame. This method generally makes loading bicycles onto the carrier simpler than the fork attachment methods common on roof mounted racks. The combination of the simple top tube carrying method and not having to lift bicycles to the roof of the automobile provides a carrier that nearly anyone can use.

Some of the most common problems associated with hitch mounted racks are as follows: 1) Most hitch mounted carriers are for transport of bicycles only and do not allow skis or other gear to be carried. Two notable exceptions are Hike-A-Bike U.S. Pat. No. 4,856,686 and T-RexRacks. The Hike-A-Bike rack holds skis in a vertical position but requires an extra attachment to do so which must again be removed before carrying bicycles. The T-RexRacks carries bicycles and skis but it holds the skis horizontally behind the automobile which puts the skis in a vulnerable position. The skis protrude from the back of the vehicle in addition to protruding unprotected from the sides of the vehicle. This arrangement results in likely damage to skis and high user liability due to the potential for injury to people or damage to adjacent vehicles as could occur in a parking lot. 2) Most hitch mounted carriers can be locked to the vehicle by using a locking hitch pin, which is common to the trailering industry. Although some carriers contain a provision to allow use of an external paddle or cable lock, few contain an integral lock to secure bicycles or skis to the carrier. 3) Most hitch mounted carriers protrude from the back of the vehicle even when not in use. This leaves the rack vulnerable to damage in parking lots or other vehicle maneuvering as well as creating a liability for the user from potential damage to other vehicles or injury to people walking near the vehicle. However, this position renders this carrier useless for transport of gear, so is only good when nothing is being carried on the rack. It is apparent that a hitch mounted carrier is needed which solves all of the fore mentioned problems. Such a carrier would carrier more gear than just bicycles, without having to add extra attachments. It would hold the gear in a protected position, provide integrated security and not protrude from the vehicle when not in use.

OBJECTS AND ADVANTAGES

Accordingly, several objects and advantages of my invention are an integral lock which with the turn of a key uses the same structure to lock bicycles or skis to the carrier. This eliminates the common hassle of keeping track of a separate paddle or cable lock or having to remove or attach extra pieces to carrier different gear. With use of a locking hitch pin to lock the carrier to the vehicle, the carrier of this invention provides for completely secure transportation of bicycles or skis. With the turn of a key no part of the carrier can be disassembled to remove bicycles or skis. Another object and advantage of my invention is an alternate carrier position which allows the carrier to be positioned close to the vehicle for carrying skis or when the carrier is not in use. This provides unsurpassed protection for skis by not allowing them to protrude behind or to the side of the vehicle. It also protects the carrier from other vehicles and objects as well as reducing the possibility of a pedestrian being injured by walking into a protruding rack.

DRAWINGS FIGURES

FIG. 1: A carrier of the preferred, embodiment showing the bicycle carrying position.

FIG. 2: A carrier of the preferred embodiment showing the ski carrying position.

FIG. 3: A detail showing the lower portion of a carrier of the preferred embodiment.

FIG. 4: A detail showing only the main components of the top portion of a carrier of the preferred embodiment.

FIG. 5: A rear view of the carrier of this invention showing its attachment to a vehicle and its ski carrying position.

FIG. 6: A rear view of the carrier of this invention showing its attachment to a vehicle and its bicycle carrying position.

FIG. 7: A detail showing only main components of the top portion of a second embodiment of the carrier of this invention.

FIG. 8: A detail showing only main components of the top portion of a second embodiment of the carrier of this invention FIG. 9: A detail showing only main components of the top portion of a third embodiment of the carrier of this invention.

FIG. 10: A pin used in the third embodiment of the carrier of this invention.

FIG. 11: A detail showing the open position of a third embodiment of a carrier of this invention.

FIG. 12: A detail showing the closed position of a third embodiment of a carrier of this invention.

DESCRIPTION OF DRAWINGS

Referring now to FIG. 1 and 2 of the drawings, a receiver assembly 1 is connected to telescope tube 4 by hinge pin 20. Receiver assembly 1 consists of receiver tube 2 and channel 3 which are welded together. Carrier assembly 5 is connected to telescope tube 4 by rivet 21. Carrier assembly 5 is comprised of main tube 6, catch 8, and ski rest base 7. Ski rest base 7 is welded to main tube 6. Catch 8 is welded to main tube 6. Ski rest assembly 9 slides into holes in ski rest base and is attached by rivets 23. Ski rest assembly 9 is comprised of two ski rest tubes 10 and five lower ski separators 11 which are welded to the ski rest tubes. Lid assembly 12 is comprised of lid 13, lock 14, lock box 15, hinge block 16 and security plate 17. For clarity of the drawings, security plate 17 is only shown in FIG. 4. Security plate 17 and lock box 15 are attached by welding to lid 13. Hinge block 16 is attached to lid by hinge pin 24. Lock 14 is attached to lid 13 by blind screws (not shown) inserted from lock box. In four locations upper ski separator 26 is welded to bike tray 18 which is welded to main tube 5.

Referring now to FIGS. 7 and 8, a second embodiment, fixed base 40 is formed of heavy gauge sheet metal and is attached by welding to main tube 6. Fixed base 40 contains two attachment points:vertical attachment point 41 and horizontal attachment point 42 which are an integral part of fixed base 40.

OPERATION OF INVENTION

Figure 5:
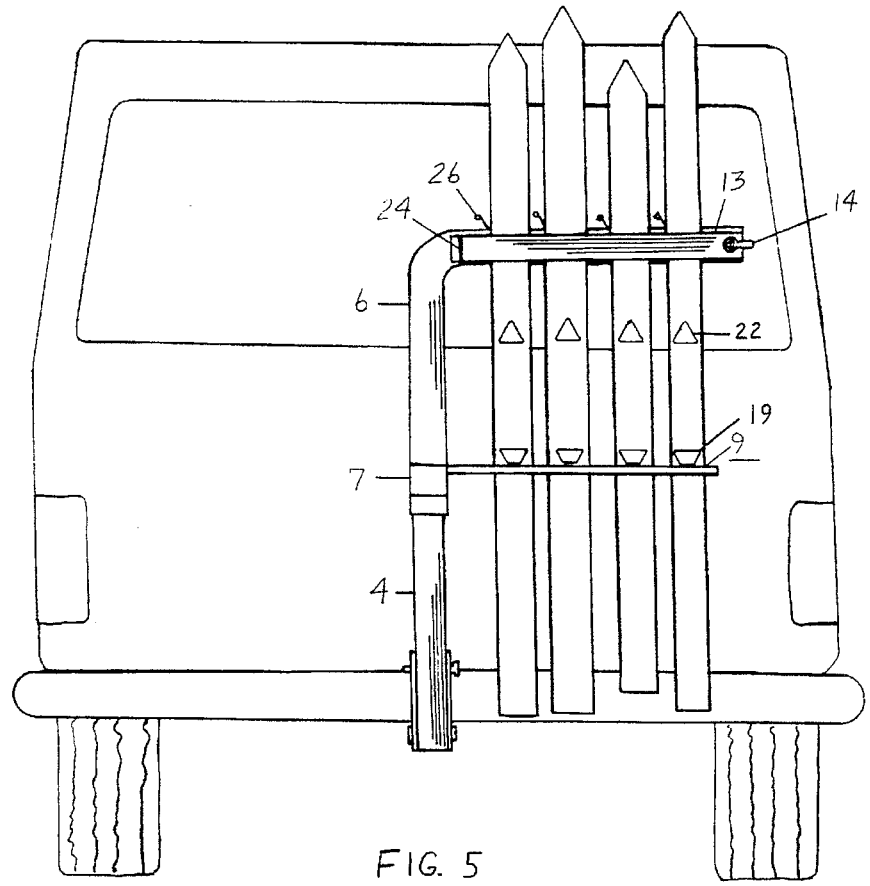

Referring now to FIGS. 1 and 2 of the drawings there is a receiver assembly 1 which mates to a receiver hitch on the back of an automobile. Main tube 6 extends up from the receiver assembly then turns 90 degrees to provide a horizontal surface to which bicycle trays 18 are attached. Telescope tube 4 attaches at its lower end to receiver assembly 1 by a hinge pin 20 which allows the carrier to tilt down and away from the back of the automobile providing access to the tail gate or rear hatch (this movement is shown in FIG. 3).

Figure 6:
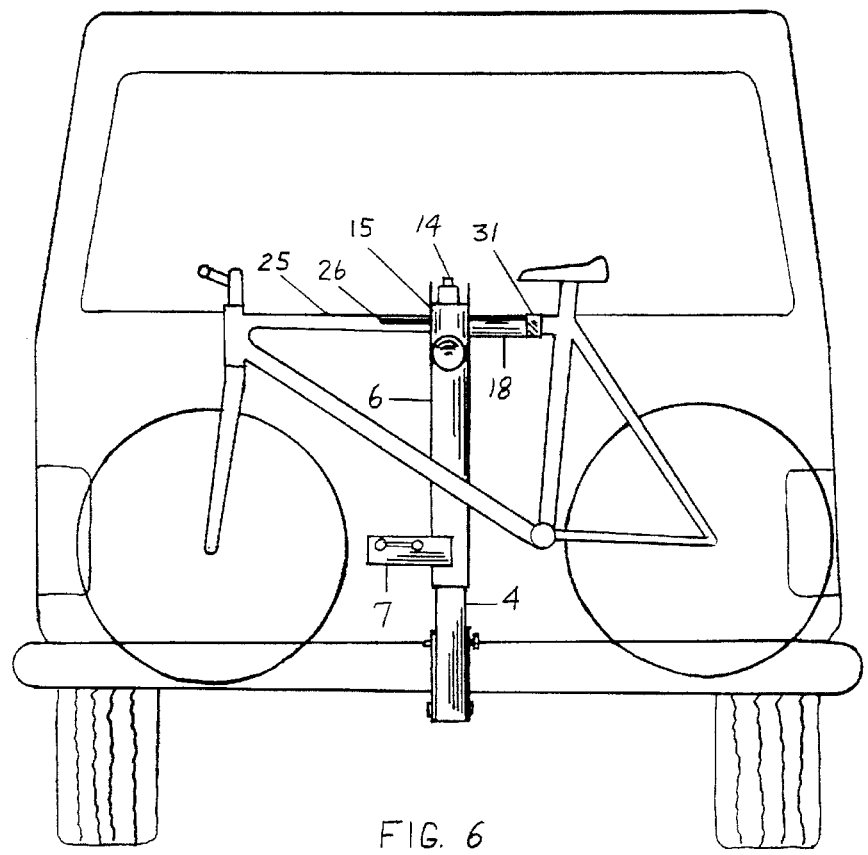
Figure 9:
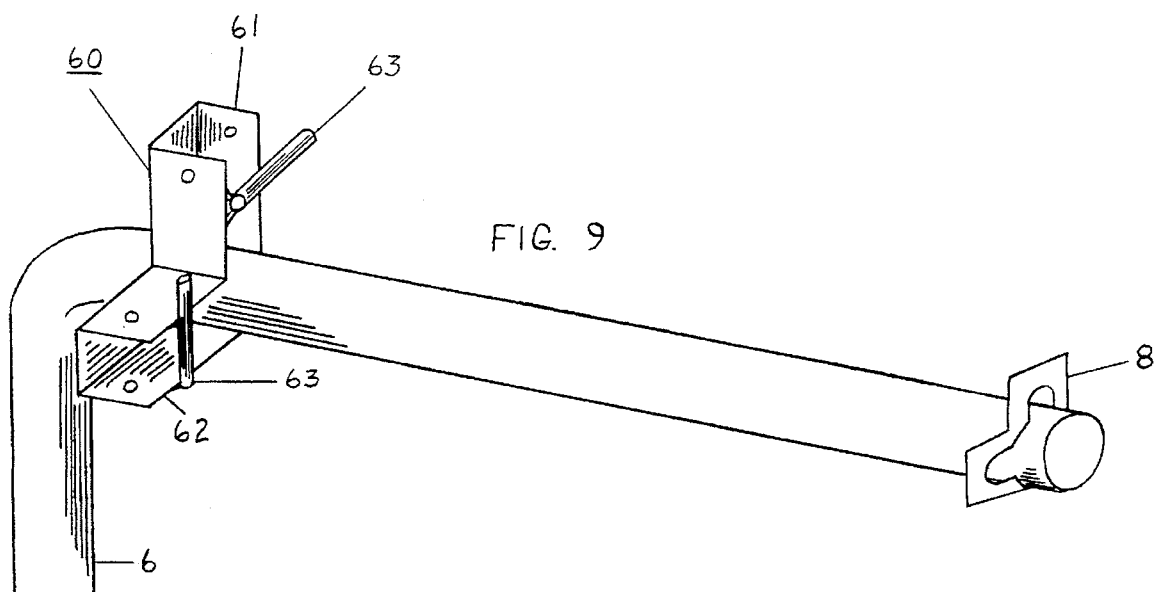
Referring now to FIGS. 9, 10, 11 and 12, a third embodiment pin base assembly 60 consists of vertical lid base 61, horizontal lid base 62 and pin stops 63. One stop pin 63 is welded to the vertical lid base 61 and one to the horizontal lid base 62 which are in turn welded to the main tube 6. Pin 50 is created by pressing rod 51 into a slightly under sized hole in tab 52. Pin securing angle 65 is made from heavy gauge sheet metal and is attached to lid 13B by welding.
Figure 10:
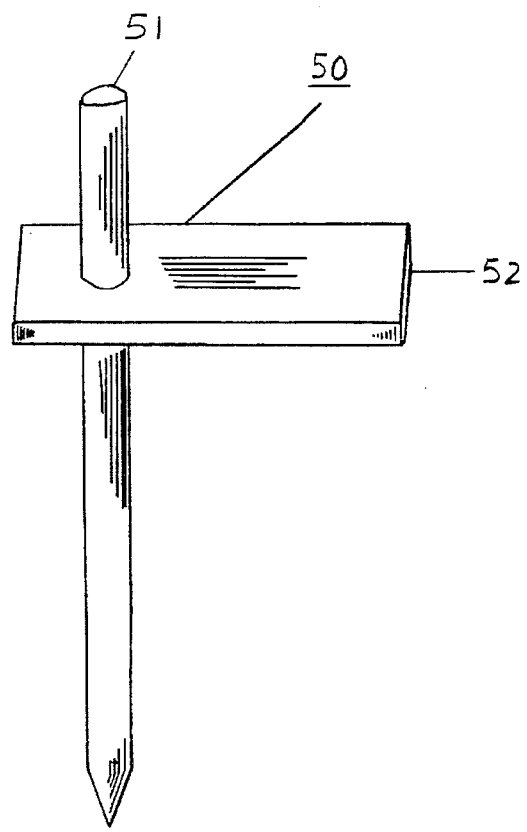
Figure 11:
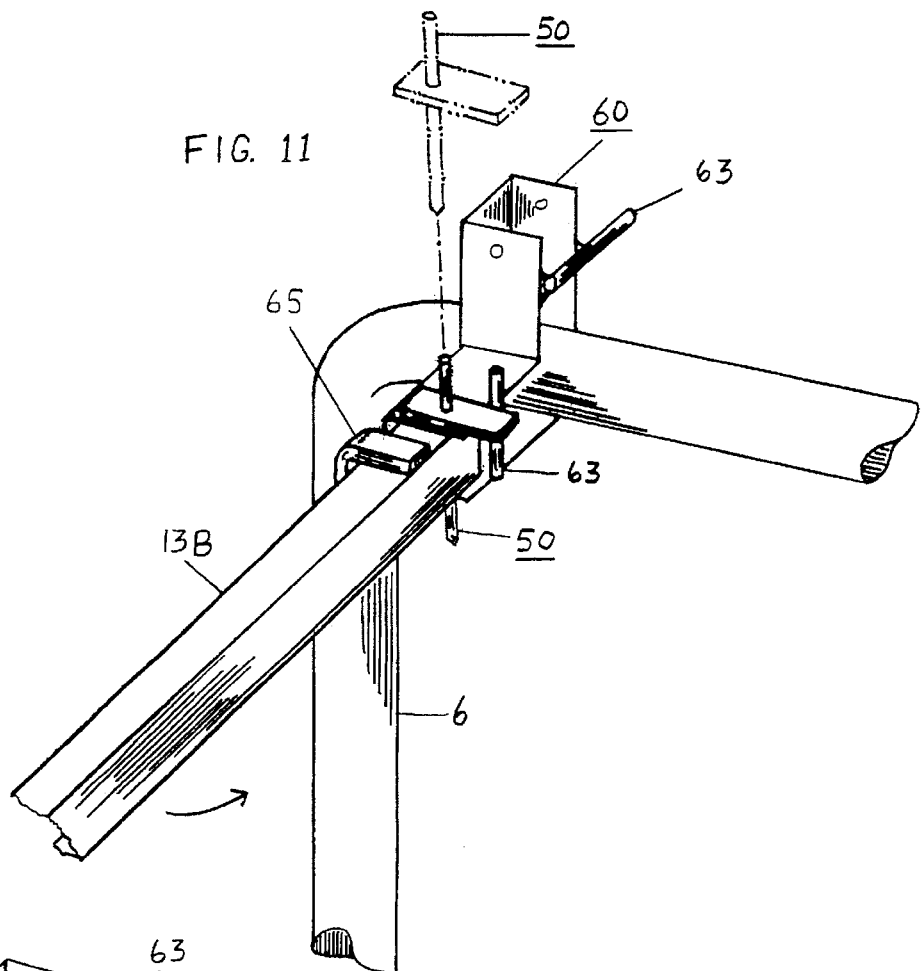
Figure 12:
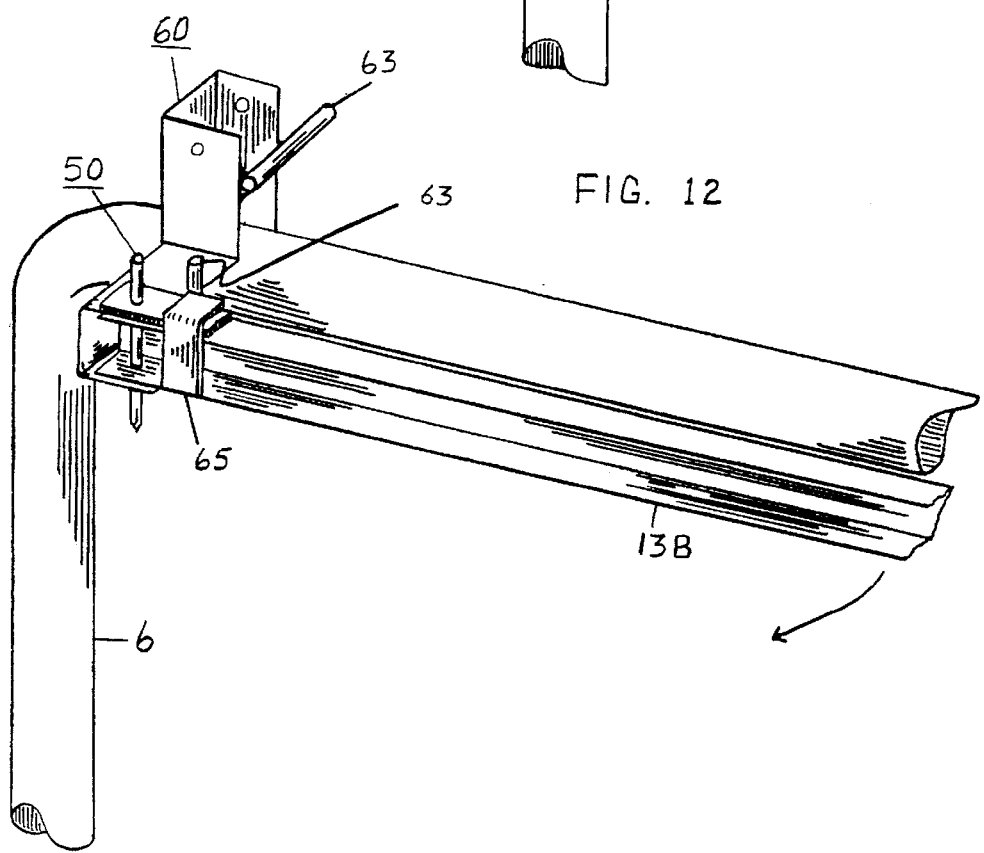

Snap pin 27 (shown in FIG. 3) inserts through receiver assembly 1 and telescope tube 4 to prevent rotation about hinge pin 20. Telescope tube 4 slides inside main tube 6. Main tube 6 can slide up and down or rotate on telescope tube 4. Rivet 21 protrudes through main tube 6 into a slot in telescope tube 4, shown in FIG. 3. This limits the motion of main tube 6 relative to telescope tube 4 to the shape of the slot. The slot in telescope tube 4 constrains the motion of main tube 6 relative to telescope tube 4 to 11 inches upward with a 90 degree turn at the top. This allows for two carrier positions: a low position for bicycles as shown in FIGS. 1 and 6, and a high position as shown in FIGS. 2 and 5, which keeps bottoms of skis away from the road surface and prevents the rack from protruding away from the automobile. A hole through telescope tube 4 in two locations allows bolt 28 (shown in FIG. 2) to be inserted in either the low or high carrier position to prevent undesired relative motion between main tube 6 and telescope tube 4.

Ski rest assembly 9 supports up to 4 pairs of skis as shown in FIG. 5. In the preferred embodiment the assembly is vinyl dipped prior to attachment to ski rest base to prevent abrasion between its surface and skis. Lower ski separators 11 prevent lateral movement of skis. The distance between the ski rest assembly 9 and horizontal portion of main tube 6 is such that rear ski binding 19 rests on the ski rest and the lid closes above upper binding 22, as shown in FIG. 5, preventing removal of the ski without opening the lid. The distance also allows ski rest assembly 9 to not interfere with placement of bicycles on the carrier as can be seen in FIG. 6. The ski rest assembly can also serve as a tie down point to tie bicycles down to prevent rotation about bicycle top tube 25.

Four bicycle trays 18 each cradle the top tube of a bicycle as shown in FIG. 6. Upper ski separators protrude from each bicycle tray and hold the top portion of skis upright and apart. Lid assembly 12 is attached to main tube 6 at either the top location as shown in FIGS. 1 and 6, or the side location as shown in FIGS. 2 and 5 by bolt 30 (shown in FIG. 4) which fits through a hole in hinge block 16 and screws into threaded holes in main tube 6 (shown in FIG. 4).

With the lid in the closed position, lock 14 engages catch 8 and lock box 15 conceals catch 8 and the latch mechanism of lock 14. FIGS. 1 and 2 show the lid in the closed position while FIG. 4 shows the lid in the open position. Security plate 17 (shown in FIG. 4) is welded to lid 13 and conceals bolt 30 when lid 13 is in the closed position.

Foam pad 29, shown in only FIGS. 1 and 2, is glued to the under side of lid 13 and applies pressure to the ski or the bicycle to help hold them in place when lid 13 is in the closed position. Additionally a hook and loop fastener 31 is provided to hold the bicycle to bicycle tray 18 on the right side of the bicycle tray as shown in FIG. 6.

A second embodiment is illustrated in FIGS. 7 and 8. In this embodiment fixed base 40 is provided which contains lid attachment point 41 oriented perpendicular to the horizontal surface of main tube 6. A second lid attachment point 42 is oriented perpendicular to the vertical surface of main tube 6. A circular cutout at the end of lid 13A, as shown in FIG. 8, allows lid 13A to engage or disengage fixed base 40 only when the lid assembly is in the full open position, shown in FIG. 8. Thus lid 13A can be engaged to fixed base 40 in either the horizontal or vertical positions. When the lid is in the closed position as it would be when it is locked, as shown in FIG. 7, lid 13A cannot be opened or removed from fixed base 40.

A third embodiment is illustrated in FIGS. 9, 10, 11 and 12. In this embodiment hinge block 16 is replaced by pin base assembly 60. Pin base assembly 60 is comprised of stop pin 63, vertical pin base 61 and horizontal pin base 62. Vertical pin base 61 and horizontal pin base 62 are welded to main tube 6 at 90 degrees apart. Lid 13B has pin securing angle 65 welded to it. With lid 13B in the open position, shown in FIG. 11, pin 50 can be inserted through holes located in pin base 61 and 62 and in lid 13B. In this way pin 50 connects lid 13B to either pin base 61 or 62 and allows lid 13B to rotate about pin 50. With lid 13B in the closed position, shown in FIG. 12, pin securing angle 65 captures pin 50 against pin stop 63 thus preventing removal of pin 50. In this way when lid 13B is locked in the closed position, pin 50 cannot be removed thus preventing undesired assess to bicycles or skis. When lid 13B is opened 90 degrees pin 50 is released and can be removed to allow lid 13B to be moved between pin bases 61 and 62 for use with either bicycles or with skis.

SUMMARY

Accordingly the reader will see that the bicycle and ski carrier of this invention allows bicycles or skis to be carried in complete security without additional attachments. A swivel feature positions the carrier close to the vehicle and perpendicular to the vehicle's axis to hold skis in a protected position and prevents carrier from protruding from the vehicle.

SCOPE

Those familiar with the art will appreciate that the invention may be employed in numerous specific configurations other than the specific forms disclosed herein, without departing from the essential substance hereof. Accordingly, the scope of the invention should be determined not by the embodiments illustrated but by the appended claims.

I claim:

1. A bicycle and ski carrier for mounting to a receiver hitch on an automobile comprising:

a. a receiver hitch attachment means adapted for attachment to the receiver hitch on the automobile, and b. a vertical member connected to said receiver attachment means, and extending upward from the receiver attachment, and c. a horizontal member connected to said vertical member, and d. a bicycle carrying means for attachment of bicycles to a horizontal surface of said horizontal member, and e. a ski support means connected to the vertical member which can support at least one ski in a vertical position, and f. a capturing means for holding said at least one ski against a vertical surface of the horizontal member where said capturing mean consists of:

aa. a rigid member, and bb. a pivotal attachment means for engaging one end of said rigid member to the horizontal member, and cc. a securing means to selectively restrain the movement of the rigid member about the pivotal attachment means, and dd. a selective positioning means for allowing said pivotal attachment means to engage the horizontal member in either a first position to allow the rigid member to capture said at least one ski against the vertical surface of the horizontal member or alternatively engage the horizontal member in a second position to allow the rigid member and the rigid member to capture a bicycle top tube adapted to be positioned in said bicycle carrying means between the horizontal surface of the horizontal member.

2. A bicycle and ski carrier for mounting to a receiver hitch on an automobile comprising:

a. a receiver hitch attachment means adapted for attachment to the receiver hitch on the automobile, and b. a vertical member connected to said receiver attachment means, and extending upward from the receiver attachment, and c. a horizontal member connected to said vertical member, and d. a bicycle carrying means for attachment of bicycles to a horizontal surface of said horizontal member, and e. a ski support means connected to the vertical member which can support at least one ski in a vertical position, and f. a capturing means for holding said ski at least against a vertical surface of the horizontal member where said capturing mean consists of:

aa. a rigid member, and bb. a first attachment means for engaging one end of said rigid member to the horizontal member, and cc. a second attachment means for engaging a second end of the rigid member to the horizontal member, and dd. a positioning means to selectively engage the horizontal member on either the vertical surface to capture said at least on ski against the vertical surface the horizontal member or engage the horizontal member on the horizontal surface to capture a bicycle top tube adapted to be positioned in said bicycle carrying means between the horizontal surface of the horizontal member and the rigid member.

3. A bicycle and ski carrier of claim 2 wherein said first attachment means consists of:

a. a hinge means connected to said rigid member, and b. a fastening means to connect said hinge means to the horizontal member such that when said hinge means is connected to the horizontal member the rigid member can pivot away from the horizontal member, and c. a concealing means to conceal and prevent access to said fastening means when the fastening means is connected to the horizontal member and said second attachment means has engaged the horizontal member.

4. A bicycle and ski carrier of claim 2 wherein said first attachment means consists of:

a. two hinge means connected permanently to the horizontal member at 90 degrees from each other, and b. the positioning means comprising a hinge attachment means connected to the rigid member which allows the rigid member to rotate about one of the hinge means from a closed position where the rigid member is parallel to the horizontal member to an open position where the rigid member is not parallel to the horizontal member where said hinge attachment means allows the rigid member to be attached to or removed from one of the hinge means when the rigid member is in the open position but the rigid member is restrained from attachment to or removal from the hinge means when the rigid member is in the closed position.

5. A bicycle and ski carrier for mounting to a trailer receiver hitch on an automobile wherein the hitch includes an axis substantially parallel to the longitudinal axis of the automobile consisting of:

a. a hitch attachment means adapted for attachment to the receiver on the automobile, and b. a vertical member which is attached to and extends upward from said hitch attachment means, and c. a horizontal member attached to said vertical member and extending along an axis parallel to the axis of said trailer receiver hitch, and d. a ski support means connected to the vertical member which when at least one ski is in a substantially vertical position allows a binding of said ski to be adapted to rest on said at least one support means, and e. a bicycle support means attached to a horizontal surface of the horizontal member where the top tube of a bicycle is adapted to rest on said support means, and f. a clamping means comprising a rigid member which captures the at least one ski is in a substantially vertical position against a vertical surface of the horizontal member, and g. a positioning means for said clamping means which alternatively allows the rigid member of the clamping means to capture the bicycle top tube resting in said support means between the horizontal surface and the rigid member.

6. A bicycle and ski carrier of claim 5 wherein said receiver attachment means is a tubular member with a square cross section which telescopes into said receiver hitch.

7. A bicycle and ski carrier of claim 5 wherein said ski support means is a substantial horizontal member with a sufficient opening to allow the at least one ski to be inserted tail end first into said opening to the point where the rear binding of said at least one ski is adapted to rest on said substantial horizontal member.

8. A bicycle and ski carrier of claim 5 wherein said clamping means consists of:

a. a pivot means connected to a first end of said rigid member, and b. a fastening means for connection of said pivot means to the horizontal member, and c. a closure means for engaging a second end of the rigid member to the horizontal member, and d. a concealing means for concealing and preventing access to said fastening means when the closure means has engaged the horizontal member.

* * * * *